United States Patent
Camacho

(10) Patent No.: US 9,930,827 B2
(45) Date of Patent: Apr. 3, 2018

(54) SYSTEMS AND METHODS FOR AERIAL SEEDING

(71) Applicant: NEW JERSEY INSTITUTE OF TECHNOLOGY, Newark, NJ (US)

(72) Inventor: Chrystoff Camacho, Springfield, NJ (US)

(73) Assignee: New Jersey Institute of Technology, Newark, NJ (US)

(*) Notice: Subject to any disclaimer, the term of this patent is extended or adjusted under 35 U.S.C. 154(b) by 128 days.

(21) Appl. No.: 15/046,301

(22) Filed: Feb. 17, 2016

(65) Prior Publication Data

US 2016/0234997 A1   Aug. 18, 2016

Related U.S. Application Data

(60) Provisional application No. 62/117,634, filed on Feb. 18, 2015.

(51) Int. Cl.
*A01C 1/04* (2006.01)
*A01C 11/00* (2006.01)

(52) U.S. Cl.
CPC ............... *A01C 11/00* (2013.01); *A01C 1/04* (2013.01); *Y02A 40/243* (2018.01); *Y02P 60/40* (2015.11)

(58) Field of Classification Search
CPC .. A01C 1/04; A01C 1/00; A01C 11/02; A01C 11/00; A01C 11/006; A01C 11/04; Y02P 60/40; Y02P 60/00; Y02P 40/243; Y02P 40/22; Y02P 40/10; Y02P 40/00
USPC ........ 111/100–102, 104–106, 114, 200, 900, 111/919, 920
See application file for complete search history.

(56) References Cited

U.S. PATENT DOCUMENTS

| | | | | |
|---|---|---|---|---|
| 3,652,034 A | * | 3/1972 | Schindler | F42B 15/36 102/374 |
| 3,755,962 A | * | 9/1973 | Walters | A01C 11/02 102/385 |
| 3,962,818 A | * | 6/1976 | Pippin, Jr. | A63H 27/005 446/212 |
| 6,379,726 B1 | * | 4/2002 | Tomasula | A23J 3/222 426/138 |
| 2006/0230999 A1 | * | 10/2006 | Long | A01C 21/00 111/200 |

* cited by examiner

*Primary Examiner* — Christopher J. Novosad
(74) *Attorney, Agent, or Firm* — Timothy X. Gibson, Esq.; Gibson & Dernier LLP

(57) ABSTRACT

Reforestation capsules composed of biodegradable materials are operable to be used in aerial reforestation operations. Capsules may contain one or more seedlings, compacted fertilizer, soil, and/or nutrients. Capsules include a flight platform component and cone tip component. The capsule structure survives impact and may serve as additional nutrient for the seedling(s). A housing unit sized and configured to contain and dispense capsules can be mounted or otherwise housed in an aircraft to deliver capsules.

20 Claims, 11 Drawing Sheets

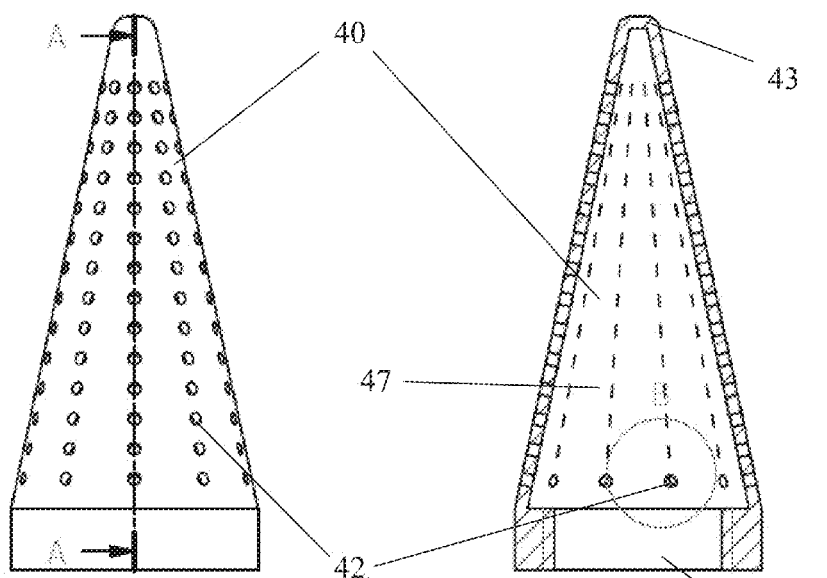
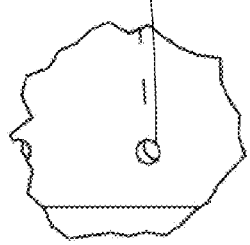
FIG. 2D
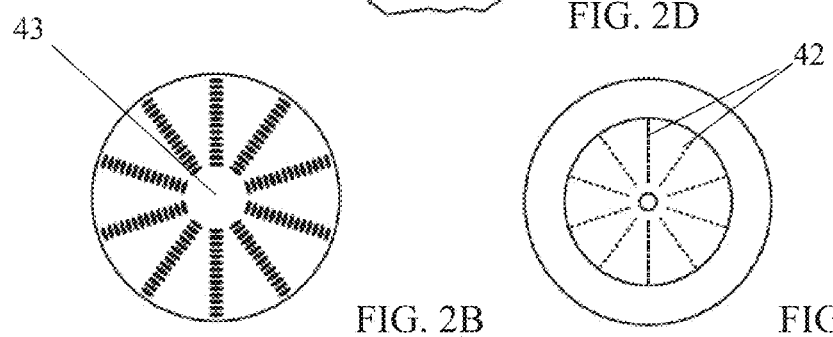
FIG. 2B    FIG. 2C

SYSTEMS AND METHODS FOR AERIAL SEEDING

CROSS-REFERENCE TO RELATED APPLICATIONS

This application claims the benefit of U.S. Provisional Patent Application No. 62/117,634 filed Feb. 18, 2015, the entirety of which incorporated herein by reference.

FIELD OF THE INVENTION

This invention relates generally to aerial seeding and in particular to aerial delivery devices and methods for planting seedlings.

BACKGROUND OF THE INVENTION

Deforestation is an increasingly difficult problem to manage. The increasing rate of deforestation is destroying many natural habitats. Techniques for reforestation include natural and artificial processes. Natural reforestation includes regenerate of the habitat itself through naturally occurring processes. Artificial reforestation involves the intervention of humans, directly regenerating the habitat through different techniques. Direct intervention is one well-known technique in which trees are planted by hand in an attempt to reforest an area. Another artificial technique is aerial seeding, such as by dispersing seeds through aerial mechanical means such as a fixed-wing or rotary wing aircraft. Aerial seeding, used both in reforestation efforts and agriculture since the 1940s, has been proven to be less expensive and more efficient than manually planting seeds. However, the current state of the art is limited by lack of sufficient ground penetration and difficulties with dispersal of larger seeds.

SUMMARY OF THE INVENTION

Embodiments disclosed herein employ novel delivery devices and methods to deliver seedlings and/or seeds aerially to reforest areas in need of reforestation. The disclosed subject matter can deliver various types of seedlings and/or seeds (e.g., grasses, trees) that the current state of the art cannot deliver. For example, devices and methods disclosed herein permit aerial reforestation with large species of trees, such as those found in the Amazon, as well as reforestation of inaccessible regions, which the current system of aerial seeding does not support. The devices and methods may also be employed in crop planting.

In accordance with one embodiment an aerial reforestation capsule (sometimes referred to herein as "ARC") is dimensioned and operable to house a pre-selected seedling, fertilizer, soil, minerals and nutrients.

In one embodiment the capsule includes a housing defining an interior chamber when assembled for housing the seedling, fertilizer, etc. The capsule includes an upper flight platform and a lower cone tip platform which are couplable such as by an interference fit, threads, or the like. The upper flight platform includes wings extending from an outer surface thereof. The wings stabilize the capsule in a downward orientated fall with the cone tip pointed towards land. The number of wings may be varied. In one embodiment the capsule include three wings. The lower cone tip platform includes a plurality of holes formed therein.

In accordance with one embodiment a reforestation capsule, operable to be used in aerial reforestation operations, includes an upper flight platform and a lower cone tip platform defining, when assembled, an interior chamber sized and dimensioned to contain at least one seedling, sapling and/or seed and optionally other materials to support the growth of the at least one seedling, sapling and/or seed, the lower cone tip platform having a housing having a hollow chamber dimensioned to house at least a portion of a seedling, a plurality of holes formed in the housing adjacent the hollow chamber, a point formed at a first end of the lower cone tip platform and a connecting portion formed at a second opposite end for coupling the lower cone tip platform to the upper flight platform, the upper flight platform including a housing having a central bore, a plurality of wings extending outwardly from an exterior surface of the housing, and a connecting portion formed at a first end and an opening at a second opposite end.

Means for coupling the upper flight platform and the lower cone tip platform at the respective connecting portions may include but are not limited to a snap-fit coupling, a threadable coupling, an adhesive coupling, interference fit coupling, and a tongue and groove coupling. In one embodiment the connecting portion of the upper flight platform includes a neck configured as a male element and the connecting portion of the lower cone tip platform includes a recess configured as a female element, wherein the neck and the recess are dimensioned to operably couple the upper flight platform and the lower cone tip platform.

The capsule may include a reservoir for storing water.

The capsule is formed in the general shape of a missile or dart and during free-fall behaves in a similar manner. The conical shape of the lower cone tip decreases drag, with the smaller surface area at the point increasing force and providing maximum ground penetration. The holes provide openings to the external environment for the seedling roots and help mediate the conditions within the capsule.

The capsule can be constructed out of biodegradable materials such as but not limited to PLA (Polylactide acid) or PHA (Polyhydroxyalkanoate). Constructing the capsule from an enzyme-degradable material such as PHA allows the capsule to be broken down by bacteria present in the external environment. Thus the plastic can be used as added nutrient to support plant growth.

In other embodiments, the capsule may be constructed of a biodegradable protein such as but not limited to casein.

The capsule may be constructed of more than one biodegradable material, and may include plant food, fertilizer and/or other materials that support plant growth.

In still further embodiments a capsule is disclosed having at least one seedling, sapling or seed contained in the interior chamber.

In some embodiments the capsule is about 5 to about 12 inches in length including the wings, and about 3 to about 7 inches in diameter, including the widest width of the wings, lower cone tip platform is about 3 to about 6 inches in length, and about 1 to about 3 inches in diameter at its widest width, the upper flight platform is about 1 to about 4 inches in length, and about 1 to about 3 inches in diameter at its widest width, the interior chamber is about 0.75 to about 1.5 inches in diameter, and the wings extend outwardly from the upper flight platform about 1.5 to about 3 inches.

In still further embodiments the capsule is about 6 to about 8 inches in length and about 4 to about 6 inches in diameter including wings, the lower cone tip platform 40 is about 3.5 to about 5.5 inches in length, and about 1.5 to about 2.5 inches in diameter, the upper flight platform 20 is about 1.5 to about 3.5 inches in length, and about 1.5 to about 2.5 inches in diameter, the interior chamber is about 1 to about 1.3 inches in diameter, and the wings extend outwardly from the upper flight platform about 1.75 to about 2.5 inches.

In yet further embodiments the holes are about 0.01 to about 0.5 inches in diameter. In other embodiments the holes are about 0.05 to about 0.2 inches in diameter. In still other embodiments the holes are about 0.1 inch in diameter.

In some embodiments the capsule weighs 0.125 to 200 grams.

In yet still a further embodiment a housing unit for containing and dispensing a capsule is disclosed, the housing unit having a door and a latch, wherein the latch is remotely or manually operable to open the door and release the contents of the housing unit.

A method of delivering at least one capsule is disclosed which includes placing a seedling in the lower cone tip platform for a selected length of time, enclosing the seedling within the capsule by coupling the upper flight platform to the lower cone tip platform, and dropping the capsule from a selected height from an aircraft to a target area selected for reforestation. The selected length of time may in some embodiments be from one to five weeks.

The capsule can support seedlings of any species of plant. The capsule permits the seedling to be guided from a pre-selected altitude to a soil depth that is suitable for the seedling to embed its roots. Seedling mortality rates are decreased by the capsule, which serves as a protective case during free-fall and impact. The capsule ensures efficient ground penetration for seedling embedment sufficient to support roots growth. To further ensure low seedling mortality rates, the capsule is configured to house essential nutrients, soil, minerals and compacted fertilizer that will nurture the seedling. The capsule enables large-scale seeding, increasing overall reforestation effectiveness.

The capsule also improves the dispersal radius of aerial seeding. Plural capsules can be uniformly discharged from an aircraft in sequence. The mass of the capsule makes it less likely to be affected by the random vectors of fast moving fluids when deployed by air, which may cause sporadic uneven dispersal. This allows the distance between each capsule after impact to be uniformly even throughout the targeted zone.

The capsule also serves to imprint the soil upon impact. The air-to-earth system disclosed herein achieves imprinting instantly for each seedling delivered, improving water retention.

Devices, systems and methods disclosed herein are highly suitable for remote deforested regions inaccessible by roads. Reforestation employing the capsules disclosed herein eliminates the need for clearing vegetation to access remote regions. Large quantities of capsules can be loaded on stacked racks in rows and columns onto any plane, but it will be apparent a cargo plane is best suited for delivery of the capsules. A pre-selected launch height and survey of the land can be performed prior to launch using sophisticated mapping systems to ensure survivability of the seedlings.

Capsules may be constructed in bulk, reducing the cost per capsule, thus creating an ideal incentive to plant trees.

BRIEF DESCRIPTION OF THE DRAWINGS

For purposes of illustration, there are forms shown in the drawings that are presently preferred, it being understood, however, that the invention is not limited to the precise arrangements and instrumentalities shown.

FIG. 2 is front view of a lower cone tip platform of a capsule of FIG. 1 in accordance with one or more embodiments of the present invention;

FIG. 2A is cross-sectional view of the lower cone tip platform of FIG. 2 taken along line A-A in accordance with one or more embodiments of the present invention;

FIG. 2B is a top view of the lower cone tip platform of FIG. 2 in accordance with one or more embodiments of the present invention;

FIG. 2C is a bottom view of the lower cone tip platform of FIG. 2 in accordance with one or more embodiments of the present invention;

FIG. 2D is a detailed perspective view of detail B of the lower cone tip platform of FIG. 2A in accordance with one or more embodiments of the present invention;

DETAILED DESCRIPTION OF INVENTION

Figure 1:
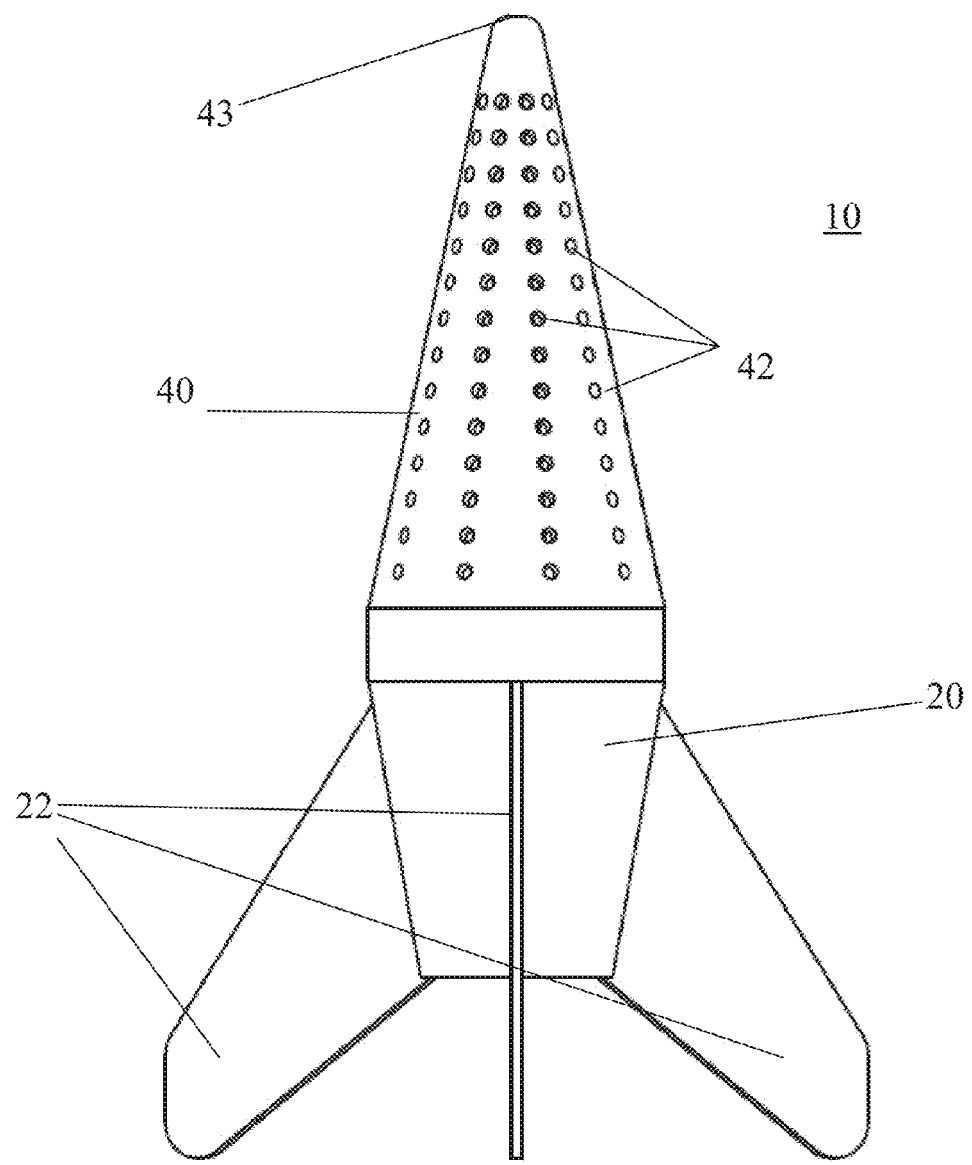
FIG. 1 is a front view of a capsule in accordance with one or more embodiments of the present invention.
Figure 1A:
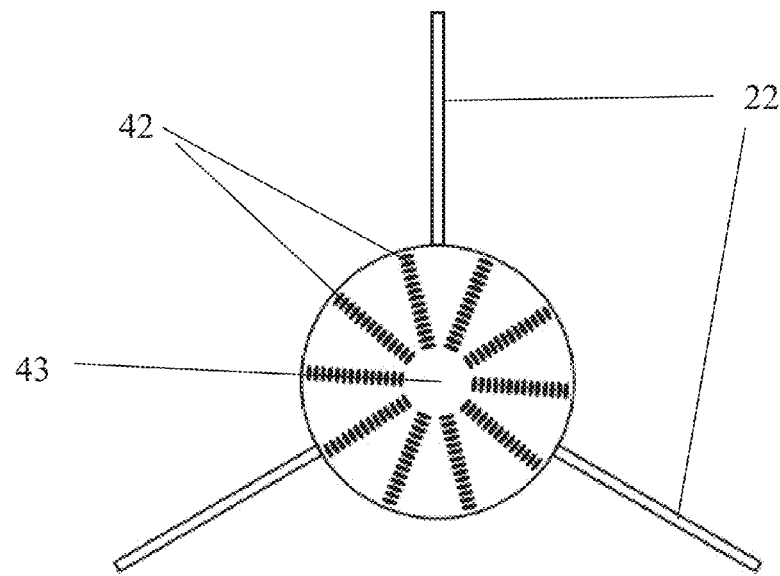
FIG. 1A is a top view of the capsule of FIG. 1 in accordance with one or more embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
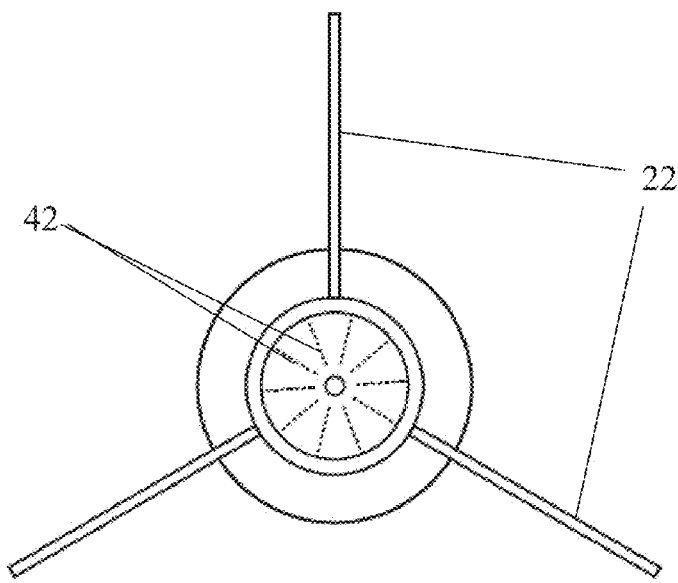
FIG. 1B is a bottom view of the capsule of FIG. 1 in accordance with one or more embodiments of the present invention.

Now referring to FIGS. 1-1B, in accordance with a first embodiment a capsule 10 includes an upper flight platform 20 and a lower cone tip platform 40. The upper flight platform 20 and lower cone tip platform 20 when assembled define an interior chamber for housing a seedling or seed(s) and optionally other materials to support the growth of the seedling or seed(s).

With further reference to FIGS. 2-2D, the lower cone tip platform 40 includes a plurality of holes 42 formed therein, point 43 and recess 45 formed proximate the opposite end of the point 43 to operably couple the lower cone tip platform 40 to the upper flight platform 20. The lower cone tip platform 40 includes a hollow chamber 47 to house a portion of a seedling and optional materials. The lower cone tip platform 40 may have any suitable cross-sectional shape, such as but not limited to cylindrical, square, triangular, hexagonal, etc. The point 43 may be rounded or be a point formed by an angle between sides of the lower cone tip platform 40.

Figure 3:
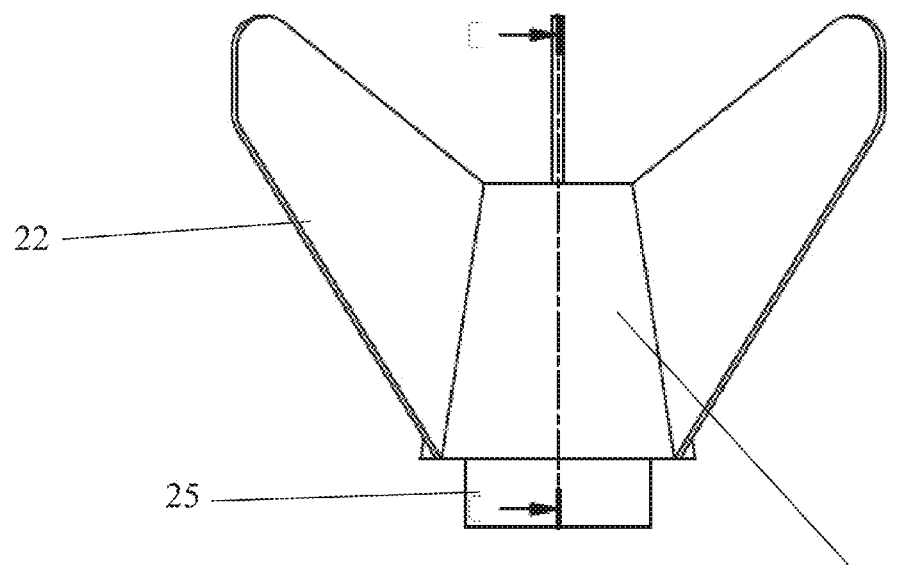
FIG. 3 is a front view of an upper flight platform of a capsule of FIG. 1 in accordance with one or more embodiments of the present invention.
Figure 3A:
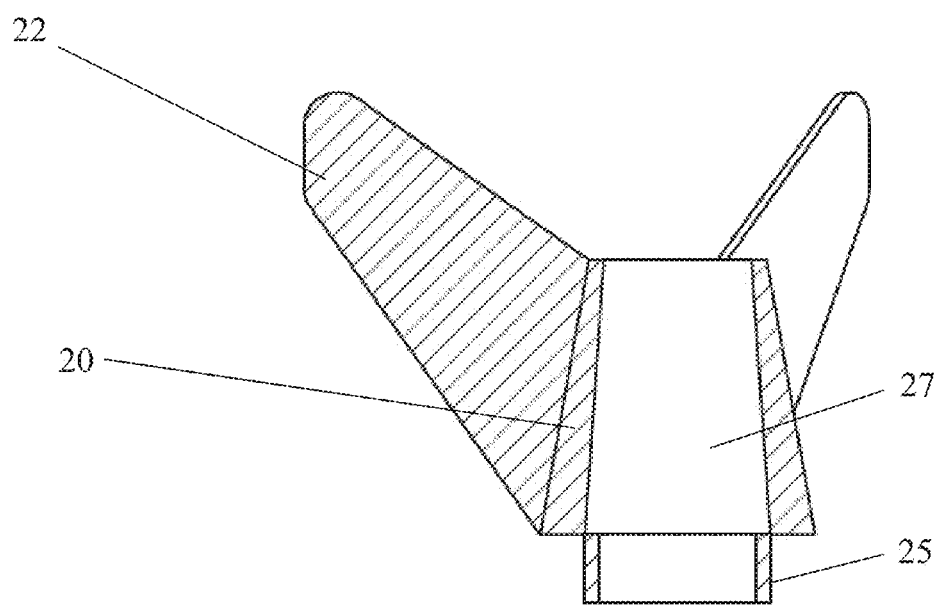
FIG. 3A is cross-sectional view of the upper flight platform of FIG. 3 taken along line C-C in accordance with one or more embodiments of the present invention.
Figure 3B:
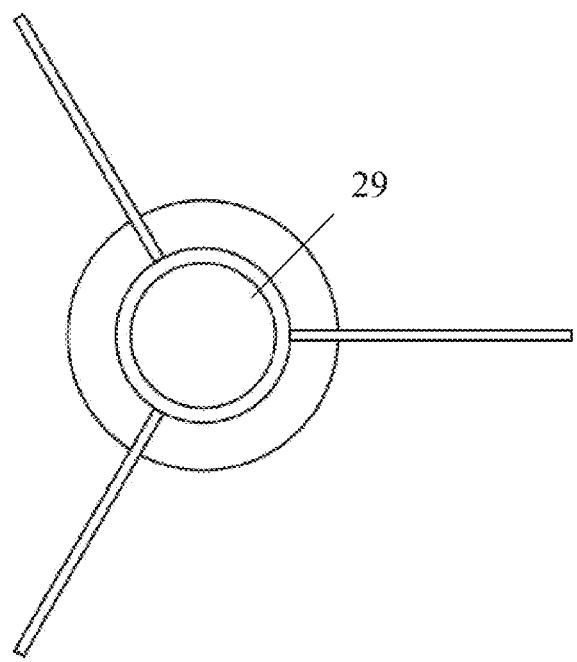
FIG. 3B is a bottom view of the upper flight platform of FIG. 3 in accordance with one or more embodiments of the present invention.
Figure 3C:
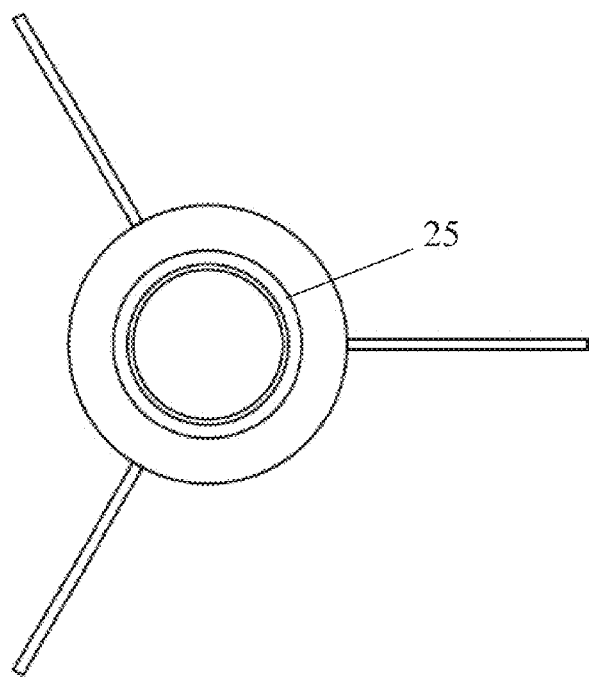
FIG. 3C is a top view of the upper flight platform of FIG. 3 in accordance with one or more embodiments of the present invention.

With further reference to FIGS. 3-3C, the upper flight platform 20 includes wings 22, preferably evenly-spaced, extending from an outer surface thereof, a neck 25 disposed at a first end to operably couple the upper flight platform 20 to the lower cone tip platform 40, and a central bore 27 to house a portion of a seedling and optional materials. The upper flight platform 20 may have any suitable cross-sectional shape, such as but not limited to cylindrical, square, triangular, hexagonal, etc. The upper flight platform 20 includes an opening 29 at the end opposite the neck 25 to permit exposure of a seedling disposed in the capsule 10 to water and sunlight. The wings 22 stabilize the capsule 10 in a downward orientated fall with the lower cone tip platform 40 pointed towards land. The upper flight platform 20 and the lower cone tip platform 40 are couplable by frictional engagement between the neck 25 and the recess 45. It will be apparent other means of coupling the parts may include but are not limited to snap fit, interference fit, threads, or the like.

The capsule 10 may be any suitable size, depending on the payload to be delivered. The capsule 10 is dimensioned and configured to support seeds and seedlings of any species of plant. By way of non-limiting example, and not by way of limitation, for housing a delivering a seedling or seed(s), the capsule 10 may be from about 5 to about 12 inches in length, including length added by the wings 22, and from about 3 to about 7 inches in diameter, including the widest width of the wings 22. The lower cone tip platform 40 may be from about 3 to about 6 inches in length, and from about 1 to about 3 inches in diameter at its widest width. The upper flight platform 20 may be from about 1 to about 4 inches in length, and from about 1 to about 3 inches in diameter at its widest width. The interior chamber may be from about 0.75 to about 1.5 inches in diameter. The wings 22 may extend outwardly from the upper flight platform from about 1.5 to about 3 inches. In some embodiments the capsule 10 is from about 6 to about 8 inches in length and from about 4 to about 6 inches in diameter including the wings 22, the lower cone tip platform 40 is from about 3.5 to about 5.5 inches in length, and from about 1.5 to about 2.5 inches in diameter, the upper flight platform 20 is from about 1.5 to about 3.5 inches in length, and from about 1.5 to about 2.5 inches in diameter, the interior chamber is from about 1 to about 1.3 inches in diameter, and the wings 22 extend outwardly from the upper flight platform from about 1.75 to about 2.5 inches.

The holes 42 may be for example from about 0.01 to about 0.5 inches in diameter for capsules 10 for seedlings. In one embodiment the holes 42 are about 0.05 to about 0.2 inches in diameter. The holes may be any suitable shape, such as but not limited to square, round, ovoid, etc. In one embodiment the holes are circular and are about 0.1 inch in diameter. The holes may be non-uniform in distribution and diameter.

The capsule 10 can be any suitable weight. In one or more embodiments the capsule 10 weighs from about 0.125 to 200 grams.

In the event a sapling is to be housed and delivered in a capsule 10, the capsule 10 and holes 42 may be sized larger. Likewise, it is possible a capsule 10 with smaller dimensions may be employed for delivery of one or more seeds.

The capsule 10 is formed in the general shape of a missile and during free-fall behaves in a similar manner. The conical shape of the lower cone tip platform 40 decreases drag, with the smaller surface area at the point 43 increasing force and providing maximum ground penetration. The holes 42 provide openings to the external environment for the seedling roots and help mediate the conditions within the capsule.

The capsule 10 may be opaque, translucent or transparent, depending on the desired conditions for plant growth.

Figure 4:
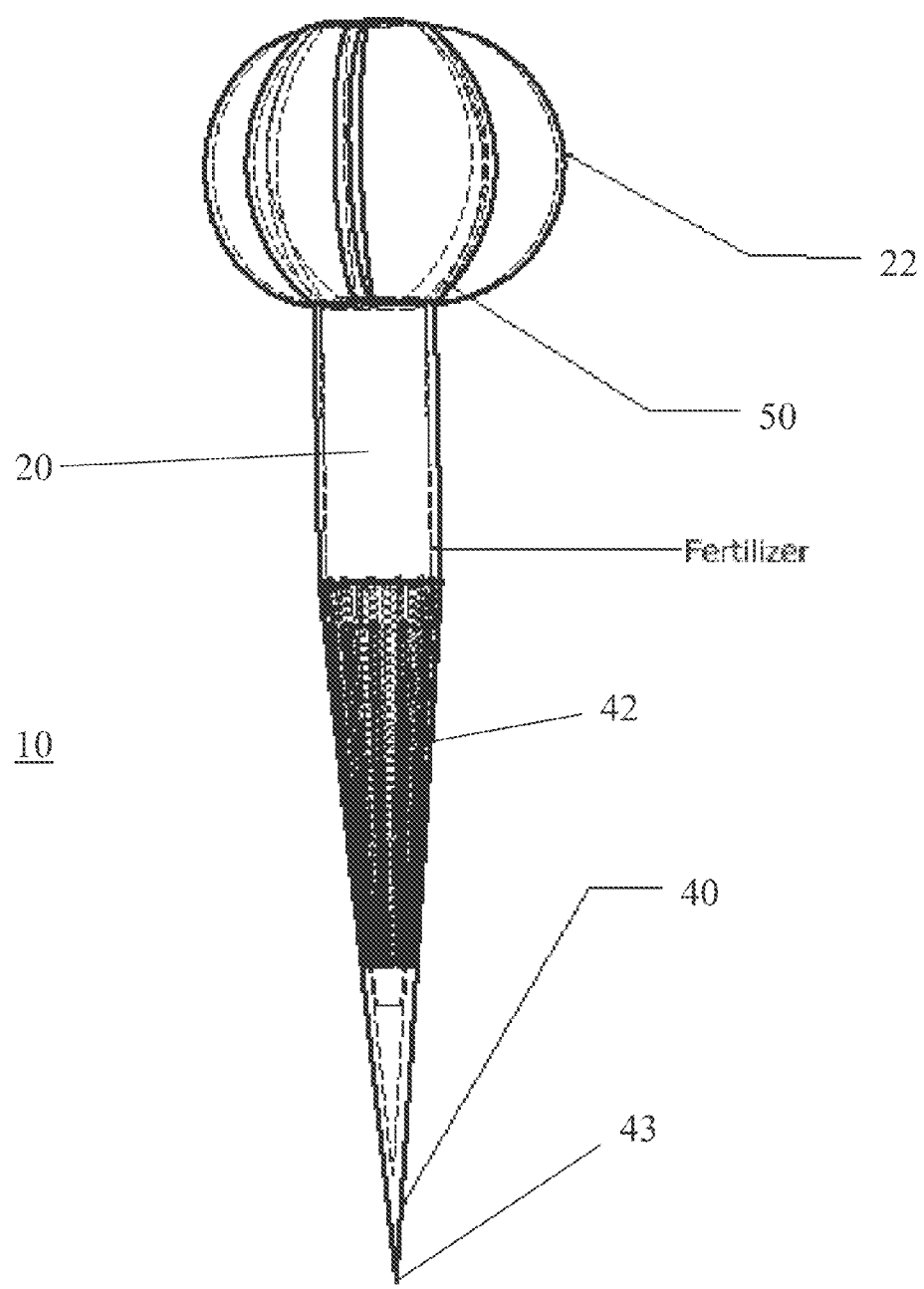
FIG. 4 is a front view of a capsule in accordance with one or more embodiments of the present invention.
Figure 5:
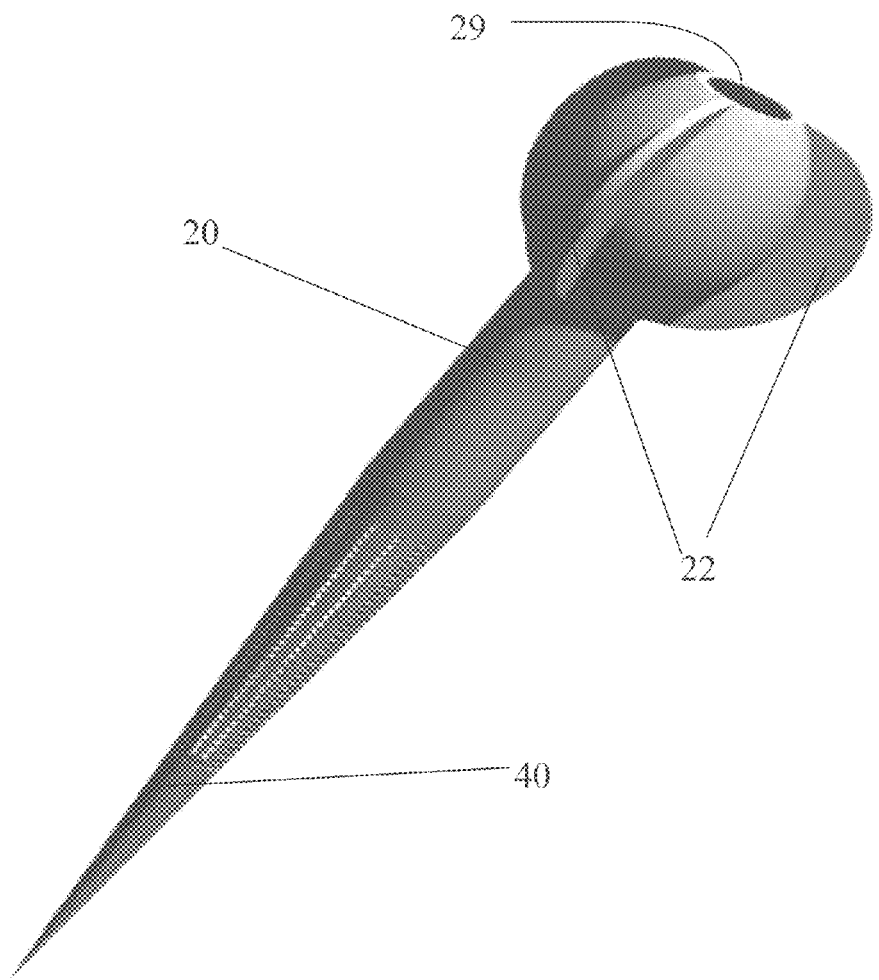
FIG. 5 is a perspective view of a capsule in accordance with one or more embodiments of the present invention.
Figure 5A:
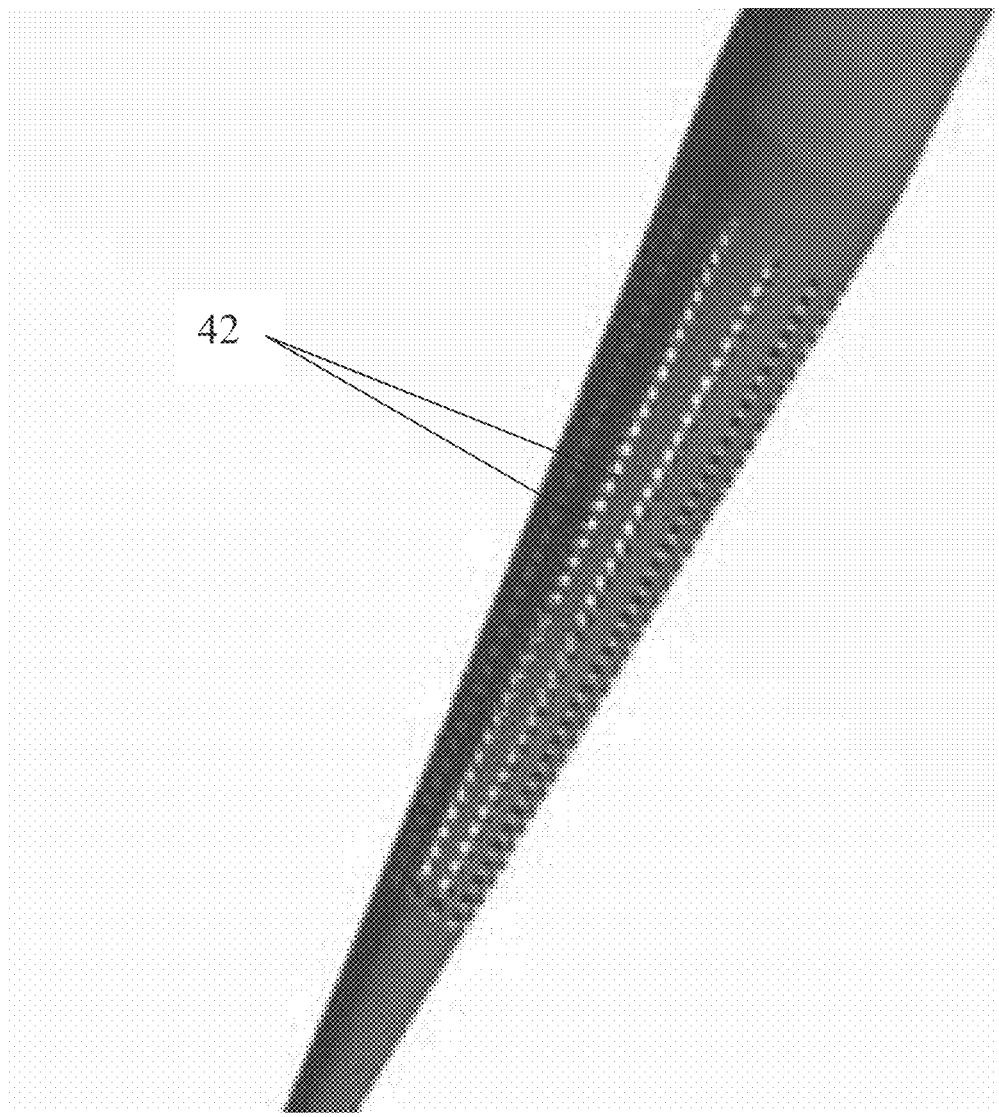
FIG. 5A is a perspective view of a section of a lower cone tip platform of FIG. 5 in accordance with one or more embodiments of the present invention.

Now referring to FIGS. 4-5A, in a further embodiment a capsule 10 having a dart-like configuration includes an upper flight platform 20 and lower cone tip platform 40 which are couplable such as by an interference fit, threads, or the like. The upper flight platform 20 includes wings 22 extending from an outer surface thereof and an opening 29. Lower cone tip platform 40 includes a pointed tip 43 and a plurality of holes 42 formed around a circumference of a section thereof. The holes 42 may be any suitable shape, such as but not limited to square, round, ovoid, etc. In one embodiment the holes are circular and about 0.01 to about 0.5 inches in diameter. In another embodiment the holes are about 0.10 inch in diameter. The holes 42 may be non-uniform in distribution and diameter. As noted the holes 42 serve as exit paths for the roots of seeds and/or saplings to the outside environment. The capsule 10 includes a reservoir 50 which may be filled with water to add weight and provide water to payload seed or seeds. The reservoir 50 is configured to contain water and may be positioned at an end of the upper flight platform 20 opposite the neck 25. The capsule 10 may be formed of a material as disclosed above and may include fertilizer. The capsule 10 may be filled with any of the materials detailed hereinabove. In one embodiment the capsule 10 includes a seedling and fertilizer.

Figure 6:
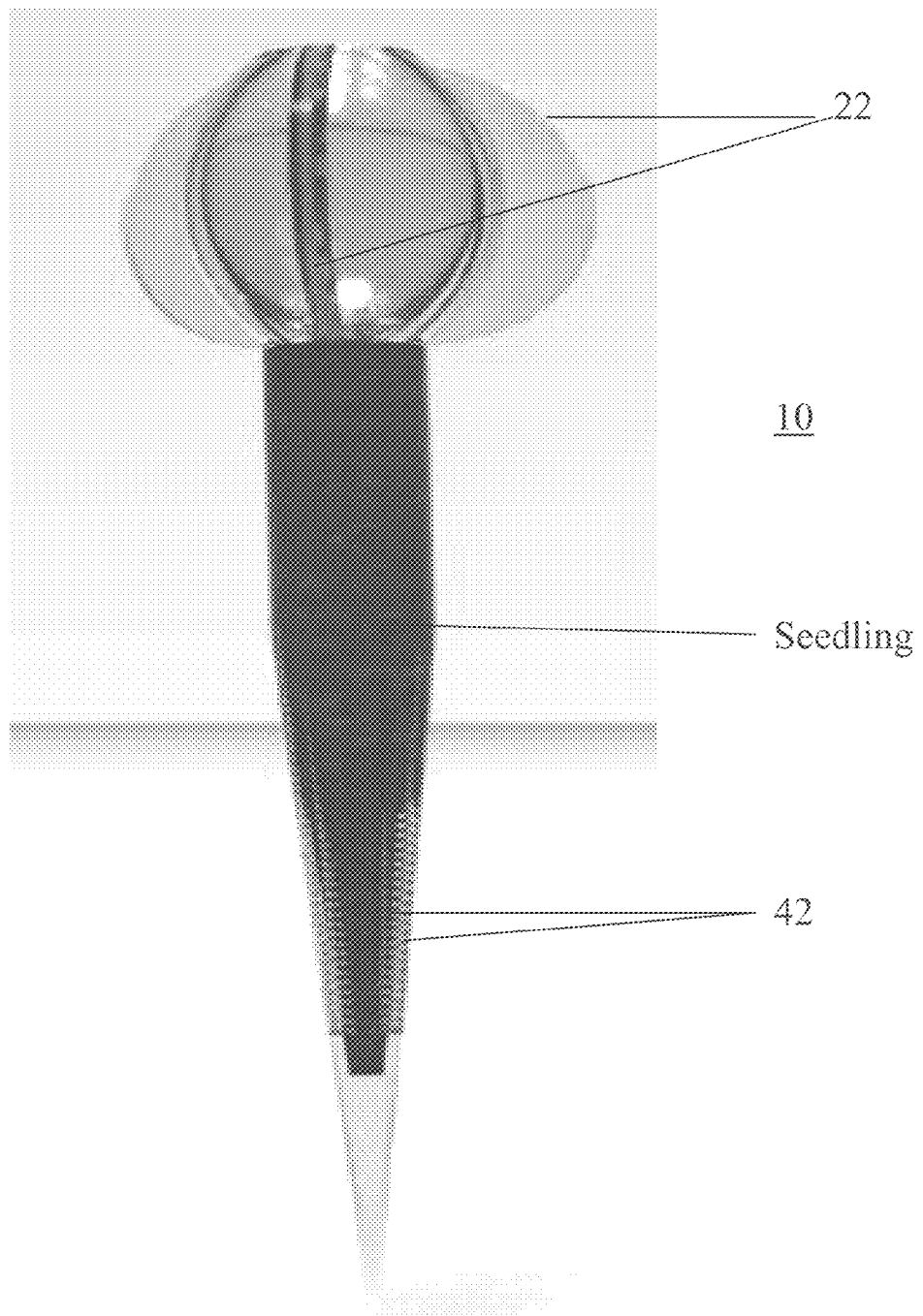
FIG. 6 is a photographic front view of a capsule containing a seedling and a soil/fertilizer/nutrient mixture in accordance with one or more embodiments of the present invention.

Now referring to FIG. 6, an embodiment of a transparent capsule is shown. A seedling is visible in the capsule 10.

The capsule 10 serves as a temporary nursery providing nutrients to the seedling while providing sufficient ground penetration for large trees seeds/saplings to thrive. The capsule 10 can be constructed out of biodegradable materials such as but not limited to PLA (Polylactide acid) or PHA (Polyhydroxyalkanoate). PHA plastic is desirable as a capsule material due to its origins as thermoplastic synthesized by many different types of bacteria. PHA can be degraded in aerobic and anaerobic environment through thermal degradation or enzymatic hydrolysis. Similarly, the creation of PLA involves bacterial fermentation, similar to the fermentation in the synthesis of PHA. This fermentation creates lactic acid, which is then polymerized. PLA can be degraded by hydrolysis with no need for external enzymes.

Constructing the capsule from an enzyme-degradable material such as PHA allows the capsule to be broken down by bacteria present in the external environment. Thus the plastic can be used as added nutrient to support plant growth.

In other embodiments, the capsule may be constructed of a biodegradable protein such as but not limited to casein. Casein is the principal protein found in cow's milk and is responsible for the white, opaque appearance of milk. Casein can be mixed with a liquid such as but not limited to water or vinegar until a pliable consistency is achieved, and then molded much like clay into any shape desired, such as a capsule 10. After it is molded the casein-based mixture hardens over a given time period, from about two hours to about two weeks depending on the materials and proportions used in the mixture. The hardness of the casein mixture once formed and dried is comparable to some strong plastics with an ideal strength and durability to weight ratio for use as a capsule 10 for aerial seeding. Bio-degradation of casein is optimal in conditions where the soil is damp and the humidity is high since casein is highly sensitive to moisture stimulating fungal biodegradation. However, over time, in all environments a casein-based capsule will completely bio-degrade.

In accordance with some embodiments the capsule 10 may further be constructed to include, in addition to PHA, PLA, casein or mixtures thereof, plant food containing nutrients such as nitrogen, etc. The capsule 10 may include in the biodegradable body thereof any nutrients that are specific to certain plants. The capsule 10 biodegrades in from one to two years, depending on the material employed and the target environment. In some embodiments the capsule will biodegrade in about 1.5 years.

The capsule 10 permits seedling to be guided from a pre-selected altitude to a soil depth that is suitable for a seedling to embed it roots. A capsule 10 is deployed by dropping from an aircraft such as but not limited to a fixed wing aircraft, balloon, helicopter, etc. The capsules 10 sized for seedlings penetrate soil from about 0.1 to about 4 inches depending on the height of the drop. For example, for a seedling capsule 10 dropped from a height of about fifty feet, the lower cone-tip platform 40 will penetrate approximately 3.75 inches.

Seedling mortality rates are decreased by the capsule 10, which serves as a protective case during free-fall and impact. In use, a seedling is placed in the capsule 10 with the root end of the seedling positioned in the lower cone tip platform 40, optionally with soil, fertilizer and/or other material depending on the particular species of plant and the target destination. The capsule 10 is closed by coupling upper flight platform 20 to the lower cone tip platform 40.

In certain embodiments, seedlings are grown outside of the capsule 10 until they reach a proper size for the capsule 10, which may be from about one day to about one month post-germination. In further embodiments seeds are utilized pre-germination. In accordance with some embodiments, the capsule 10 may be sized and dimensioned to house saplings, such as with larger tree species, when it is helpful to have roots already formed that are ready to interact with the external environment immediately after impact from aerial seeding.

In accordance with some embodiments, a seedling is positioned in a lower cone tip platform 40 initially for a preselected period of time, such as from a few days to a few weeks before the capsule 10 is to be delivered to a target area. In one embodiment the time period is from about one to about five weeks. In other embodiments the time period is from about two to four weeks. In accordance with such embodiments, the capsule 10 is not sealed by the addition of the upper flight platform 20 until shortly before the capsule 10 is ready to launch.

To further ensure low seedling mortality rates, the capsule 10 is configured to house essential nutrients, soil, minerals and fertilizer that will nurture the seedling, allowing for a wide range of conditions and species that can be seeded using the capsule 10. In one embodiment the payload in each capsule 10 provides a temporary artificial environment that sufficiently stimulates growth in the seed or seedling along with biodegradation of the capsule 10. In this way nutrients are provided within and by the capsule 10 as the capsule 10 biodegrades completely.

In certain embodiments, the capsule 10 is filled only with seed or a seedling. In yet further embodiments, the capsule 10 is filled with a mixture of one or more of soil, packed dirt, clay, fertilizer, nitrogen, water and/or nutrients in any combination along with a seed or seedling. In accordance with one embodiment, the capsule 10 contains only a seedling and fertilizer. In other embodiments more than one seed and/or seedling is included in a capsule 10. In yet a further embodiment different types of seeds and/or seedlings are included in a capsule 10.

Seedling & Seed Types

The capsule 10 can house a variety of tree seedling species between 4-10 inches in lower cone tip platform 40. Because of the opening 29 the seedlings can extend 3-4 inches or more beyond the upper flight platform 20. The size and type of the seedling or seed(s) depends on the reforestation type and orientation of deployment. The capsule 10 can also house dormant seeds as its payload, if necessary.

Type of Soil

Any suitable soil may be contained in the capsule 10. The principal type of the soil used may be primarily vermicompost soil gathered from worm byproduct. Vermicompost is the product or process of composting using various worms, usually red wigglers, white worms, and other earthworms to create a heterogeneous mixture of decomposing vegetable or food waste, bedding materials, and vermicast.

Type of Fertilizer

Any suitable fertilizer may be contained in the capsule 10. In some embodiments the fertilizer is mainly nitrogen-enriched fertilizer that is readily found in the market. Typically fertilizers are composed of nitrogen, phosphorus, and potassium compounds. They also contain trace elements that improve the growth of plants. The primary components in fertilizers are nutrients which are vital for plant growth. Milorganite fertilizer, one of the oldest branded fertilizers on the market today, is a suitable choice. It is composed of heat-dried microbes that have digested the organic matter in wastewater. Milorganite is manufactured by the Milwaukee Metropolitan Sewerage District. NPK rating (or N-P-K) is used to label fertilizer based on the relative content of the chemical elements nitrogen (N), phosphorus (P), and potassium (K) that are commonly used in fertilizers. The N value is the percentage of elemental nitrogen by weight in the fertilizer. It will be apparent to one skilled in the art the selection of fertilizer for inclusion in a capsule may depend at least in part on the species of seedling and the target environment.

Plant Food

Water soluble plant foods completely dissolve in water and release their nutrients immediately thereafter. Examples of suitable water soluble plant foods that may be included in the capsule 10 include but are not limited to those containing urea, ammonium sulfate and/or ammonium phosphate.

Controlled release plant foods contain a plant nutrients in a form that delays its availability for plant uptake significantly longer than a water soluble plant food. Examples of suitable controlled release plant foods include but are not limited to sulfur coated or polymer coated urea.

Example—Construction of Capsule

An exemplary capsule was constructed using a computer aided design (CAD) program. A StereoLithography (STL) file was then created from the CAD design. STL files are native to many CAD softwares created by 3D systems. A 3-D printer was used to create all prototypes including the capsules disclosed herein. The 3-D printer can use a range of materials including but not limited to PLA and PHA. Adjustment or changes were made using the CAD software and the same steps were followed. A mold for the capsule was made in order to construct the capsules and replicate it, but other standard industrial practices are possible. Each capsule part has its own mold, upper flight platform and lower cone tip platform. Capsules are created using a liquid injection process, where the material of choice (PHA, PLA) is injected into the mold. The liquid forms to the mold, taking the shape of the capsule. Curing time varies by method and process, but is typically from about 25-35 minutes. The capsule will hold about 0.05 kilograms of content but can hold an additional 0.125 kilograms of soil, fertilizer, and nutrients (plant food).

An exemplary capsule was constructed with the following specifications:

Mass
Mass (Capsule only) 0.075 kg
Mass (Capsule & Content) 0.125 kg
Shell volume (Cone tip) 34600 mm$^3$
Lateral Area (Cone tip) 106.128 cm$^2$
Base Area (Cone tip) 20.428 cm$^2$
Surface Area (Cone tip) 7080 mm$^2$
Area and Volume
Projected Surface Area 126 cm$^2$
Drag coefficient 0.6 cda
Terminal Velocity (capsule only) m/s 47.5 m/s
Terminal Velocity (capsule & content) m/s 61.4 m/s
Terminal Velocity (capsule only) ft/s 156.0 ft/s
Terminal Velocity (capsule & content) ft/s 201.4 ft/s
Terminal Velocity (capsule only) mph 106.4 mph
Terminal Velocity (capsule & content) mph 137.3 mph
Performance Specifications
Kinetic Energy 235.62 joules
LBS-FT 173.78 Lbs-Ft
Terminal Velocity Force 7.675 newtons The capsule 10 enables large-scale seeding, increasing overall reforestation effectiveness. The capsule 10 also improves the dispersal radius of aerial seeding. Plural capsules 10 can be uniformly discharged from an aircraft in sequence. The mass of the capsule 10 makes it less likely to be affected by the random vectors of fast moving fluids when deployed by air, which may cause sporadic uneven dispersal. This allows the distance between each capsule 10 after impact to be uniformly even throughout the targeted zone.

The capsule 10 also serves to imprint the soil upon impact. Imprinting is a technique of roughening and opening a soil surface, improving infiltration, that is, the exchange of rainwater, soil and air across the air-earth interface. The technique of imprinting, funnels water towards a central point and provides shading from the sun. Imprinting has been proven to be a highly effective technique in reversing desertification. However, conventional imprinting techniques require heavy manual labor and/or expensive machinery. The air-to-earth system employing capsules 10 as disclosed herein achieves imprinting instantly for each seedling delivered, improving water retention.

Experiments

Upon impact each capsule imprints a conical cutout into the ground. Experiments have shown that using the capsule as an imprinting tool, water is retained about 27% more efficiently than in unimprinted soil. This was tested in two separate containers in a confined volume of 2 ft×2 ft×6 inches. About 59.17 ml (about ¼ cup) of soil sample was collected from both containers and compressed to a mass of about 35.23 grams. Thereafter, approximately 118.25 ml of water was evenly distributed to each container. Thereafter another sample of soil was collected and weighed. The ending mass for the soil with water was about 46.18 grams respectively for both containers. Another batch of soil was collected again after uniformly exposing both containers to LED grow lights for about 4 hours. The beginning sample for both containers weighed about 35.23 grams. The saturated sample for both containers weighed about 46.18 grams. After exposing both containers to LED grow lights for 4 hours the ending sample for the unimprinted soil was about 32.54 grams and the imprinted sample about 44.75 grams. The imprinted soil sample retained about 27% more ml/g of water than the unimprinted sample. The imprinted soil retained about 22% more ml/g of water than the pre-exposed sample of 35.23 grams. Soil within the capsule shares similar retention rate averaging about 23-25% more water than the exterior soil, and is able to retain water 17-25% better than exposed soil.

Figure 7:
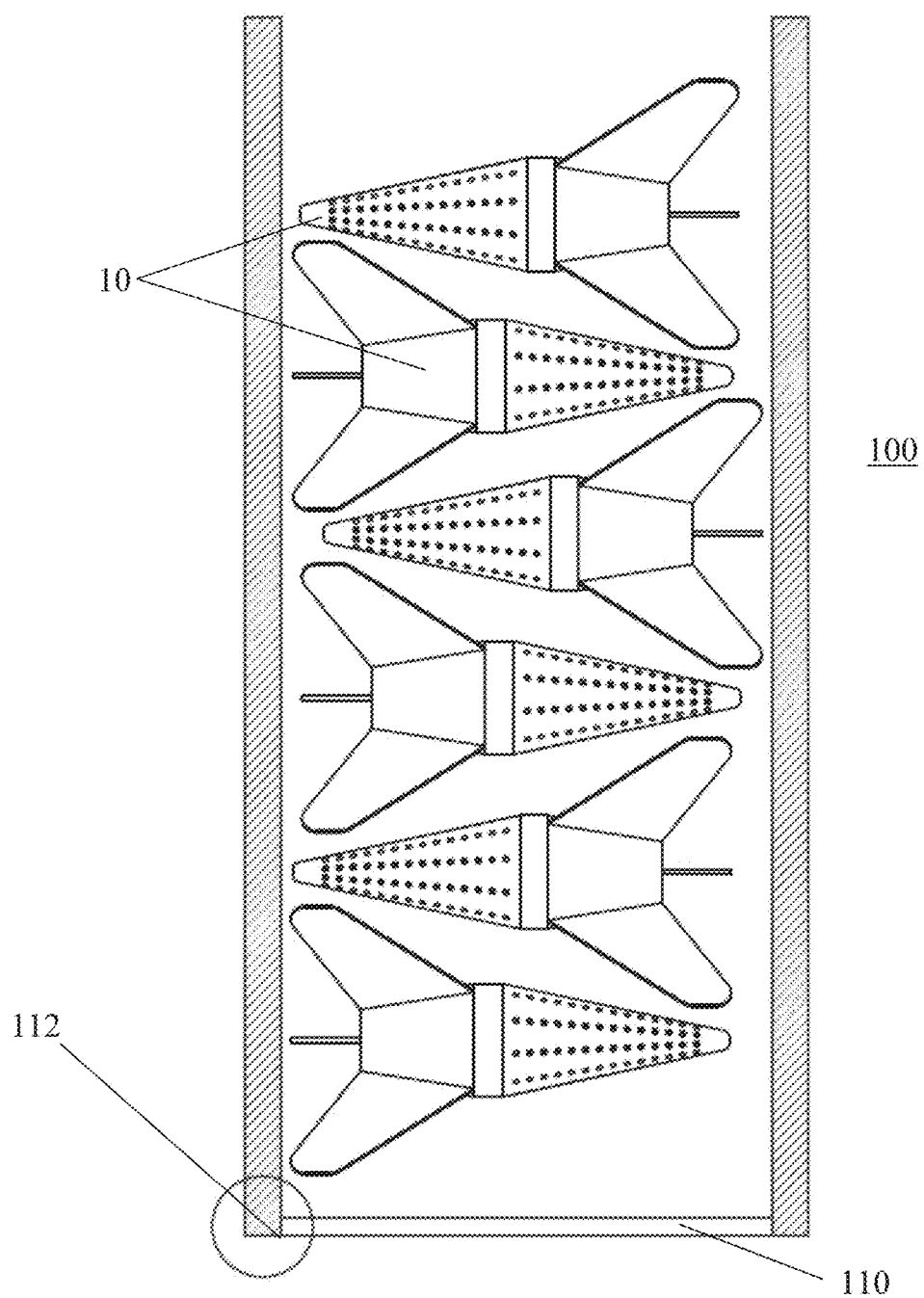
FIG. 7 is a partial sectional view of a housing holding a plurality of capsules in accordance with one or more embodiments of the present invention.
Figure 8:
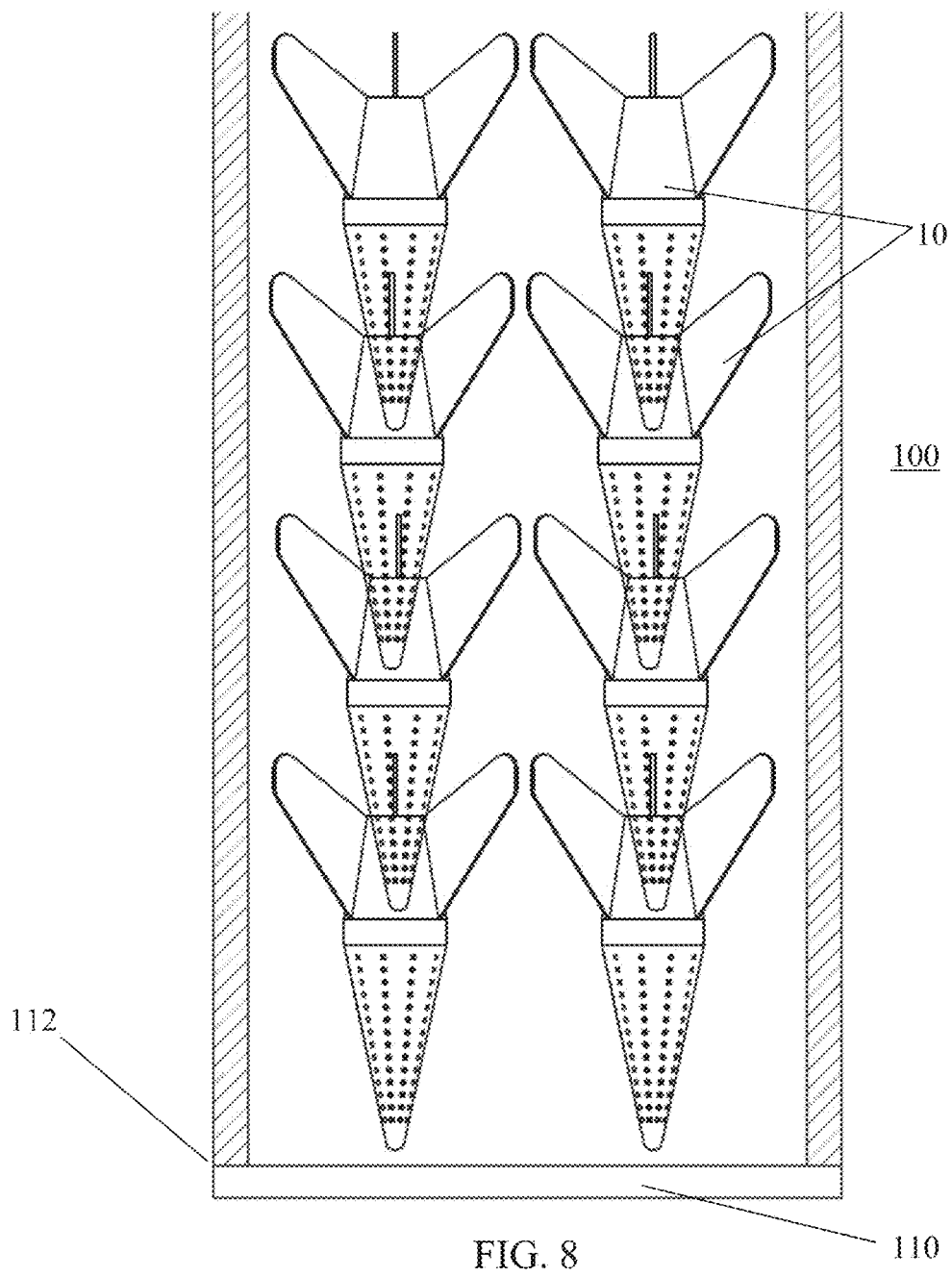
FIG. 8 is a partial sectional view of a housing holding a plurality of capsules in accordance with one or more embodiments of the present invention.

Now referring to FIGS. 7 and 8, a housing unit 100 for containing and dispensing plural capsules 10 is disclosed. In one embodiment the housing unit 100 is a rectangular or other shaped structure. The shape of the housing unit may be modified to conform to the dimensions of an aircraft interior.

The housing unit 100 can be mounted or otherwise housed in an aircraft to deliver capsules. The housing unit 100 can store capsules 10 in an alternating arrangement as shown in FIG. 7, or nested as shown in FIG. 8. The housing unit 100 can be of any suitable size, depending on the size and capacity of the aircraft that will carry the housing unit 100 and the number of capsules 10 to be delivered. The housing unit 100 includes a door 110 and a latch 112 which may be remotely or manually released and/or engaged. Plural housing units 100 may be arranged in an aircraft in rows and columns. Each housing unit 100 may for example hold from about 60 to about 80 capsules. Ten rows of six columns results in 60 housing units 100, which in total will hold 3,600-4,800 capsules. Plural capsules can be uniformly discharged from an aircraft in sequence by opening the doors 110 of each housing 100 sequentially. The door 110 of each housing unit may be opened to release capsules intermittently, at regular intervals, or in one load from a housing unit 100. The mode of delivery of the capsules 10 from the housing units 100 will depend on the speed and height of the aircraft and the density of capsules desired to be delivered to a selected target area. In one embodiment, all the capsules of a single housing unit 100 are released sequentially. It will be apparent an aircraft may be modified to accommodate the housing unit 100 and the desired mode of delivery.

Thus, the capsules and systems disclosed herein provide several advantages over currently available technologies. Imprinting using the capsule has shown increased water retention rates. The capsule holes disposed around its central axis serve as pores, allowing interactions between the exterior environment and the interior environment within the capsule. The series of holes mediate the conditions within the capsule. Rainfall can be collected through the capsule's top opening, where precipitation will be funneled into the cone-tip. Excessive water is expelled through the holes and water can be obtained from the surrounding environment through osmosis if necessary. The capsule inner walls serve as temporary shielding from intense sun exposure. The construction of the capsule from biodegradable materials such as PHA, PLA or casein cause it to biodegrade through the exposure of sunlight, soil, fresh water, salt-water, and aerobic, anaerobic, and compost processes. The biodegradable material is completely organic and serves as additional supplemental nutrients for the seedling during the entire biodegradation phase. The capsule is constructed from assembled parts, i.e., the lower cone tip and upper flight platforms. This construction allows the seedling to grow within the cone tip platform of the capsule prior to deployment and then later enclosed by the upper flight platform prior to launch. The design of the capsule makes the overall process of preparation and transportation of the product easier.

The benefits of the technology extend to operational cost and management. Using an airborne method as a reforestation alternative reduces the operational cost of planting. An airborne operational cost will only include the initial cost of an aircraft, which can be rented or leased, initial planning, fuel, and the cost per capsule and seedling.

Although the devices, systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. All publications, patent applications, patents, figures and other references mentioned herein are expressly incorporated by reference in their entirety.

What is claimed is:

1. A reforestation capsule operable to be used in aerial reforestation operations, the capsule comprising a flight platform and a cone tip platform defining, when assembled, a contiguous interior chamber sized to contain at least one of a seedling, sapling or seed, the cone tip platform comprising a cone tip platform housing comprising a hollow chamber sized to house at least a portion of the at least one seedling, sapling or seed, a plurality of holes formed in the cone tip platform housing adjacent the hollow chamber, a point formed at a first end of the cone tip platform and a cone tip platform connecting portion formed at a second opposite end for coupling the cone tip platform to the flight platform, the flight platform comprising a flight platform housing having a central bore, a plurality of wings extending outwardly from an exterior surface of the flight platform housing, a flight platform connecting portion formed at a first end of the flight platform, a reservoir configured to contain water positioned at a second, opposite end of the flight platform and an opening formed at the second, opposite end of the flight platform.

2. The reforestation capsule of claim 1 comprising a means for coupling the flight platform connecting portion and the cone tip platform connecting portion.

3. The reforestation capsule of claim 2 wherein the means for coupling the flight platform connecting portion and the cone tip platform connecting portion is selected from the group consisting of a snap-fit coupling, a threadable coupling, an adhesive coupling, interference fit coupling, and a tongue and groove coupling.

4. The reforestation capsule of claim 1 wherein the flight platform connecting portion comprises a neck configured as a male element and the cone tip platform connecting portion comprises a recess configured as a female element, wherein the neck and the recess are dimensioned to operably couple the flight platform and the cone tip platform.

5. The reforestation capsule of claim 1 wherein at least a portion of the capsule comprises biodegradable material.

6. The reforestation capsule of claim 5 wherein the biodegradable material comprises at least one of PLA, PHA or casein.

7. The reforestation capsule of claim 5 wherein at least a portion of the capsule is formed of fertilizer or plant food.

8. The reforestation capsule of claim 1 wherein the flight platform and the cone tip platform comprise a biodegradable material.

9. The reforestation capsule of claim 1 wherein the capsule has an outer profile of a missile or a dart.

10. The reforestation capsule of claim 1 wherein the plurality of wings includes three wings.

11. The reforestation capsule of claim 1 comprising materials to support the growth of the at least one of a seedling, sapling, or seed.

12. The reforestation capsule of claim 1 wherein the capsule comprises at least one of a seedling, sapling or seed contained in the interior chamber.

13. The reforestation capsule of claim 1 wherein the capsule is about 5 to about 12 inches in length including the wings, and about 3 to about 7 inches in diameter, including the widest width of the wings, the cone tip platform is about 3 to about 6 inches in length, and about 1 to about 3 inches in diameter at a widest width thereof, the flight platform is about 1 to about 4 inches in length, and about 1 to about 3 inches in diameter at a widest width thereof, the interior chamber is about 0.75 to about 1.5 inches in diameter, and the wings extend outwardly from the flight platform about 1.5 to about 3 inches.

14. The reforestation capsule of claim 1 wherein the capsule is about 6 to about 8 inches in length and about 4 to about 6 inches in diameter including wings, the cone tip platform is about 3.5 to about 5.5 inches in length, and about 1.5 to about 2.5 inches in diameter, the flight platform is about 1.5 to about 3.5 inches in length, and about 1.5 to about 2.5 inches in diameter, the interior chamber is about 1 to about 1.3 inches in diameter, and the wings extend outwardly from the flight platform about 1.75 to about 2.5 inches.

15. The reforestation capsule of claim 1 wherein each of the plurality of holes is about 0.01 to about 0.5 inches in diameter.

16. The reforestation capsule of claim 1 wherein each of the plurality of holes is about 0.1 inch in diameter.

17. The reforestation capsule of claim 1 wherein the capsule weighs 0.125 to 200 grams.

18. A housing unit for containing and dispensing a reforestation capsule according to claim 1, the housing unit comprising a door and a latch, wherein the latch is remotely or manually operable to open the door and release the contents of the housing unit.

19. A method of delivering at least one reforestation capsule according to claim 1 comprising placing a seedling in the cone tip platform for a selected length of time, enclosing the seedling within the capsule by coupling the flight platform to the cone tip platform, and dropping the capsule from a selected height from an aircraft to a target area selected for reforestation.

20. The method according to claim 19 wherein the selected length of time is from one to five weeks.

* * * * *